United States Patent
Yun

(10) Patent No.: US 12,153,207 B2
(45) Date of Patent: Nov. 26, 2024

(54) RADIATIONAL COOLING FILM PROVIDING A VARIABLE WAVELENGTH AND WAVELENGTH CONVERSION DEVICE AND SYSTEM USING THE SAME

(71) Applicant: SHERPA SPACE INC., Daejeon (KR)

(72) Inventor: Choa Mun Yun, Daejeon (KR)

(73) Assignee: SHERPA SPACE INC., Daejeon (KR)

( * ) Notice: Subject to any disclaimer, the term of this patent is extended or adjusted under 35 U.S.C. 154(b) by 444 days.

(21) Appl. No.: 17/528,192

(22) Filed: Nov. 17, 2021

(65) Prior Publication Data
US 2022/0382040 A1     Dec. 1, 2022

(30) Foreign Application Priority Data
Jun. 1, 2021   (KR) .......................... 10-2021-0070534

(51) Int. Cl.
*G02B 5/20*    (2006.01)
*A01G 9/14*    (2006.01)
*G02B 26/00*   (2006.01)

(52) U.S. Cl.
CPC ......... *G02B 26/008* (2013.01); *A01G 9/1438* (2013.01); *G02B 5/208* (2013.01)

(58) Field of Classification Search
CPC .......... G02B 26/008; G02B 5/20; G02B 5/26; A01G 9/1438; A01G 9/227; A01G 9/22; Y02A 40/25
USPC ......................................................... 359/350
See application file for complete search history.

(56) References Cited

U.S. PATENT DOCUMENTS

| 4,852,469 A * | 8/1989 | Chuang .............. B60H 1/00785 454/75 |
| 2015/0301247 A1* | 10/2015 | Taima ..................... C09D 5/004 359/359 |
| 2016/0081281 A1* | 3/2016 | Horinek ............... A01G 9/1438 47/65.5 |

(Continued)

FOREIGN PATENT DOCUMENTS

| EP | 3544063 A1 | 9/2019 |
| JP | 1989-040520 U | 3/1989 |

(Continued)

OTHER PUBLICATIONS

KR OA Dated Nov. 21, 2023.
KR OA Dated Sep. 5, 2023.

*Primary Examiner* — William R Alexander
(74) *Attorney, Agent, or Firm* — Harvest IP Law, LLP

(57) ABSTRACT

A radiational cooling film providing a variable wavelength which determines a solar heat shielding rate according to the internal temperature of a facility and changes a wavelength conversion section of the film exposed to sunlight to radiate a necessary wavelength according to the growth stage of plants, and a wavelength conversion device and system using the same are provided. The radiational cooling film providing a variable wavelength includes a base layer including a first region and a second region on one surface, a heat barrier layer disposed on a part of the other surface of the base layer, the first region being provided with the heat barrier layer, and the second region being not provided with the heat barrier layer, and a wavelength conversion layer including a plurality of wavelength conversion sections separated from each other in each of the first region and the second region.

19 Claims, 7 Drawing Sheets

(56) References Cited

U.S. PATENT DOCUMENTS

| | | |
|---|---|---|
| 2017/0288080 A1 | 10/2017 | Carter |
| 2019/0183059 A1 | 6/2019 | Yun et al. |
| 2019/0284471 A1 | 9/2019 | Gu |
| 2021/0270470 A1* | 9/2021 | Plinke .................... F24S 60/30 |

FOREIGN PATENT DOCUMENTS

| | | |
|---|---|---|
| JP | 1989-040520 A | 4/1989 |
| JP | 2014-103856 A1 | 6/2014 |
| KR | 10-2015-0025244 A | 3/2015 |
| KR | 1020150113457 A | 10/2015 |
| KR | 10-1795443 B1 | 11/2017 |
| KR | 101795443 A | 11/2017 |
| WO | 2008-126766 A1 | 10/2008 |

* cited by examiner

RADIATIONAL COOLING FILM PROVIDING A VARIABLE WAVELENGTH AND WAVELENGTH CONVERSION DEVICE AND SYSTEM USING THE SAME

CROSS-REFERENCE TO RELATED APPLICATION

This application claims priority from Korean Patent Application No. 10-2021-0070534, filed on Jun. 1, 2021 in the Korean Intellectual Property Office, the disclosure of which is incorporated herein by reference in its entirety.

BACKGROUND

1. Technical Field

Apparatuses and methods consistent with exemplary embodiments relate to a radiational cooling film providing a variable wavelength and a wavelength conversion device and system using the same, and more particularly to a radiational cooling film providing a variable wavelength which determines a solar heat shielding rate depending on an inner temperature of a facility and varies a wavelength conversion section of the film exposed to sunlight to radiate a necessary wavelength depending on a growth stage of plants, and a wavelength conversion device and system using the same.

2. Description of the Related Art

In general, plants receive energy through light and grow through photosynthesis and respiration. Vegetative and reproductive growth of plants is affected by the length of day and the photosynthetic photon flux (PPF), and growth of plants depends on wavelength. Plants photosynthesize in the wavelength range of 380 to 760 nm including visible light, and radiation energy in the wavelength band in which photosynthesis occurs is referred to as photosynthetic active radiation (PAR). Plants each require different wavelengths and PPFs. Therefore, it is very important to secure light necessary for the growth of crop in a greenhouse or a plant factory.

When it is difficult to secure light sources, artificial light sources are installed to induce growth and development of crops, but the artificial light sources consume a lot of power and require a lot of maintenance cost of the facility.

Therefore, although using sunlight is the most efficient to cultivate crops it is difficult to artificially determine the amount of radiation of sunlight or artificially change a wavelength range irradiated from sunlight in a facility using sunlight.

For example, if there is a large amount of sunlight incident at noon, the indoor temperature of the facility is higher than a proper temperature, so it is necessary to operate a cooling system that lowers the indoor temperature, and accordingly, the power used increases.

A related art (Korean Patent Unexamined Publication No. 10-2015-0113457) discloses technology related to a plant cultivation apparatus with artificial light sources for plant factories. Although this technology may provide light sources needed for plants, it cannot adjust the internal temperature of the facility, so efficient cooling and heating costs management cannot be expected.

3. Bibliography

PROJECT SERIAL NO.: 1415174708
PROJECT NO.: 20212020800050
RELEVANT MINISTRY: Korea Ministry of Trade, Industry and Energy
RESEARCH AND MANAGEMENT INSTITUTE: Korea Institute of Energy Technology Evaluation and Planning
RESEARCH PROJECT NAME: Core Technology Development for Energy Demand Management
RESEARCH SUBJECT NAME: Development and Demonstration of Rooftop Greenhouse-type Smart Green Building Convergence and Fusion System Based on Multi-distributed Power Generation
CONTRIBUTION RATE: 100%
PROJECT EXECUTION ORGANIZATION: Sherpa Space Inc.
RESEARCH PERIOD: 2020. 5. 1~2025. 12. 31

SUMMARY

Aspects of one or more exemplary embodiments provide a radiational cooling film providing a variable wavelength which determines a solar heat shielding rate depending on an inner temperature of a facility and varies a wavelength conversion section of the film exposed to sunlight to radiate a necessary wavelength depending on the growth stage of plants, and a wavelength conversion device and system using the same.

Additional aspects will be set forth in part in the description which follows and, in part, will become apparent from the description, or may be learned by practice of the exemplary embodiments.

According to an aspect of an exemplary embodiment, there is provided a radiational cooling film providing a variable wavelength including: a base layer including a first region and a second region on one surface, a heat barrier layer disposed on a part of the other surface of the base layer, the first region being provided with a heat barrier layer and the second region being not provided with the heat barrier layer, and a wavelength conversion layer including a plurality of wavelength conversion sections separated from each other in each of the first region and the second region.

The wavelength conversion sections may be repeatedly formed in the same manner in the first region and the second region.

The wavelength conversion sections may be formed on a remaining surface of the base layer.

The wavelength conversion sections may be formed on a surface of the base layer in which the heat barrier layer is formed.

The first region may include a plurality of heat barrier sections having different heat shielding rates.

The wavelength conversion sections may be repeatedly formed in the same manner in each of the heat barrier sections and the second region.

The first region and the second region may be alternately and repeatedly arranged, and one wavelength conversion section configured to radiate the same wavelength may be arranged throughout the first region and the second region adjacent to each other.

According to an aspect of another exemplary embodiment, there is provided a wavelength conversion device providing a variable wavelength including: a radiational cooling film configured such that one surface of a base layer includes a first region in which a heat barrier layer is formed and a second region in which the heat barrier layer is not formed, and a wavelength conversion layer includes a plurality of wavelength conversion sections separated from each other in each of the first region and the second region, and a driving unit including two rollers configured to wind both ends of the radiational cooling film, a motor configured to apply rotational force to at least one of the two rollers, and a controller configured to control an RPM and a rotational direction of the motor.

According to an aspect of another exemplary embodiment, there is provided a wavelength conversion system providing a variable wavelength including: a wavelength conversion device including a radiational cooling film configured such that one surface of a base layer includes a first region in which a heat barrier layer is formed and a second region in which the heat barrier layer is not formed, and a wavelength conversion layer includes a plurality of wavelength conversion sections separated from each other in each of the first region and the second region, and a driving unit including two rollers configured to wind both ends of the radiational cooling film, a motor configured to apply rotational force to at least one of the two rollers, and a controller configured to control an RPM and a rotational direction of the motor, a temperature sensor installed in a facility, and a management server configured to control the wavelength conversion device so that sunlight is radiated to one of the wavelength conversion sections of the first region if a value measured by the temperature sensor is greater than a threshold value.

The wavelength conversion system may further include a camera configured to photograph living bodies to be grown in the facility, and the management server may include an analyzing module configured to determine a growth stage of the living bodies to be grown based on image data transmitted by the camera, and an indicating module configured to determine one of the first region and the second region based on the value measured by the temperature sensor and to control the wavelength conversion device so that sunlight is radiated to one of the wavelength conversion sections of the determined region to emit a necessary wavelength depending on the determined growth stage.

BRIEF DESCRIPTION OF THE DRAWINGS

The above and other aspects and features will be more clearly understood from the following description of the exemplary embodiments with reference to the accompanying drawings, in which.

DETAILED DESCRIPTION

Hereinafter reference will be made in detail to exemplary embodiments, examples of which are illustrated in the accompanying drawings. However, it will be understood that the exemplary embodiments are provided only to completely disclose the invention and cover modifications, equivalents or alternatives which come within the scope and technical range of the invention.

In the following description of the exemplary embodiments, singular forms may be intended to include plural forms as well, unless the context clearly indicates otherwise.

In the following description of the exemplary embodiments, it will be understood that, when a part "has" or "comprises" an element, the part may further include other elements, and does not exclude the presence of such other elements, unless stated otherwise.

In the following description of the exemplary embodiments, it will be understood that the terms " . . . unit", " . . . module" and " . . . component" indicate units for processing at least one function or operation, and may be implemented using hardware, software or a combination of hardware and software.

Figure 1:
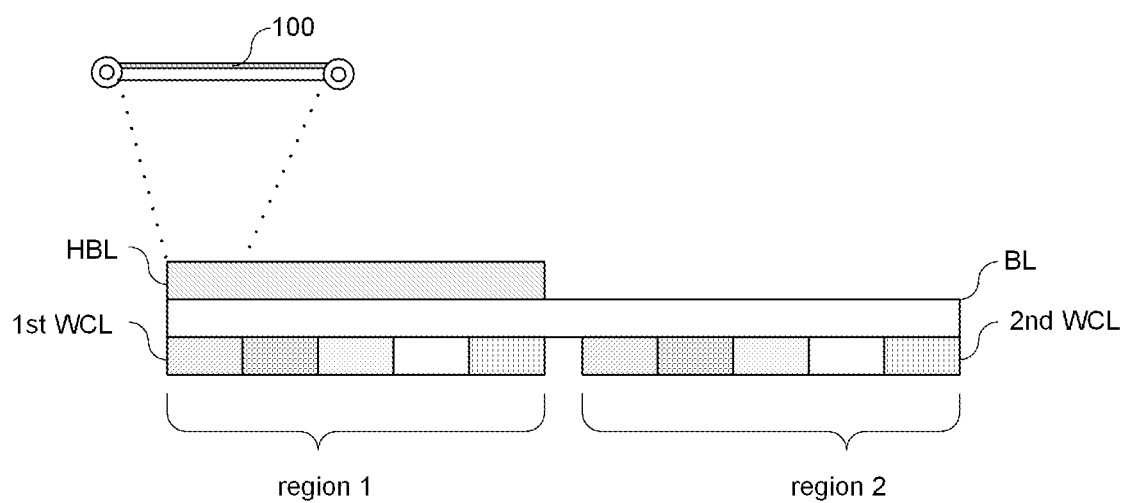
FIG. 1 is a structural diagram of a radiational cooling film according to a first exemplary embodiment.

FIG. 1 is a structural diagram of a radiational cooling film according to a first exemplary embodiment.

Referring to FIG. 1, the radiational cooling film includes a base layer BL, a heat barrier layer HBL and a wavelength conversion layer WCL.

One surface of the base layer BL is coated with the heat barrier layer HBL, and the base layer BL supports and protects the heat barrier layer HBL.

The base layer BL may be formed of one of polyethylene terephthalate (PET), polycarbonate, nylon, polypropylene (PP), polyethylene naphthalate (PEN) and polyamide.

The base layer BL includes a first region, i.e., a region 1, in which the heat barrier layer HBL is formed, and a second region, i.e., a region 2, in which the heat barrier layer HBL is not formed. The region 1 and the region 2 may have the same area.

The heat barrier layer HBL is coated on one surface of the base layer BL to prevent radiant heat from being introduced into the base layer BL or emitted from the base layer BL. The heat barrier layer HBL may include at least one of polydimethylsiloxane (PDMS), silicon dioxide ($SiO_2$) and silver (Ag) to reflect infrared light. However, the heat barrier layer HBL is not limited to these compositions, and may employ any composition which may reflect the infrared band.

The wavelength conversion layer WCL converts and outputs the wavelength of sunlight to radiate a wavelength of sunlight required according to the growth stage of living bodies to be grown. The living bodies to be grown may be either plants or algae.

The wavelength conversion layer WCL is formed on the other surface of the base layer BL, and is formed in the region 1 and the region 2 of the base layer BL.

The wavelength conversion layer WCL has a plurality of wavelength conversion sections separated from each other. Each wavelength conversion section of the region 1 and the region 2 has different wavelength shift characteristics. A wavelength conversion material of one of quantum dots, perovskites, phosphors and cellophane may be used to shift the wavelength.

For example, the wavelength conversion sections may include a section A including quantum dots configured to emit red light, a section B configured to intactly output sunlight, a section C configured to block sunlight, a section D including quantum dots configured to emit blue light, and a section E including quantum dots configured to emit green light. The wavelength configuration and the order of arrangement of the wavelength conversion sections are not limited to the above example, but may vary depending on a designer or the type of the living bodies to be grown. Further, although this embodiment describes five wavelength conversion sections, the number of the wavelength conversion sections may be less than five or more than five.

The wavelength conversion sections are repeated in the same manner in the region 1 and the region 2. That is, the wavelength conversion sections are arranged to have the same wavelength configuration in the same order in the region 1 and the region 2.

Alternatively, the wavelength conversion sections may be provided in different manners in the region 1 and the region 2. For example, the region 1 in which the heat barrier layer HBL is formed may employ A-type wavelength conversion sections for crops which grow well in normal weather or cool weather, and the region 2 in which the heat barrier layer HBL is not provided may employ B-type wavelength conversion sections for crops which grow well in hot weather.

Figure 2:
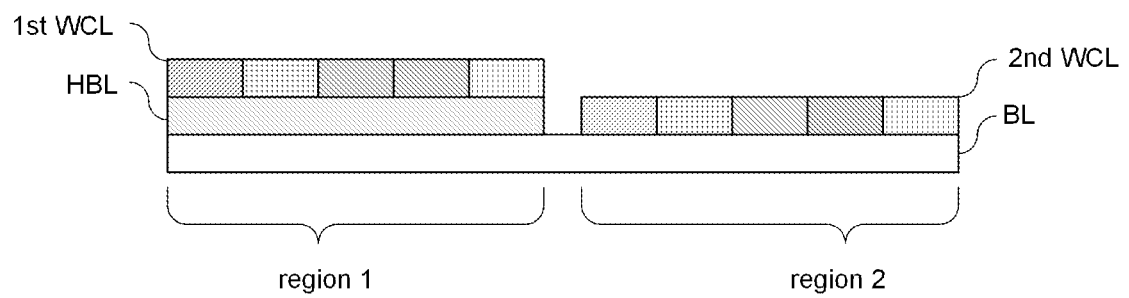
FIG. 2 is a structural diagram of a radiational cooling film according to a second exemplary embodiment.

FIG. 2 is a structural diagram of a radiational cooling film according to a second exemplary embodiment.

Referring to FIG. 2, in the radiational cooling film, both a wavelength conversion layer WCL and a heat transfer layer HBL are formed on one surface, i.e., on the same surface, of a base layer BL.

The base layer BL, the heat barrier layer HBL and the wavelength conversion layer WCL are sequentially stacked in a region 1 in which the heat barrier layer HBL is formed, and the base layer BL and the wavelength conversion layer WCL are sequentially stacked in a region 2 in which the heat barrier layer HBL is not formed.

A plurality of wavelength conversion sections of the wavelength conversion layer WCL may be formed in the same manner in the region 1 and the region 2, or may be formed in different manners in the region 1 and the region 2.

Figure 3:
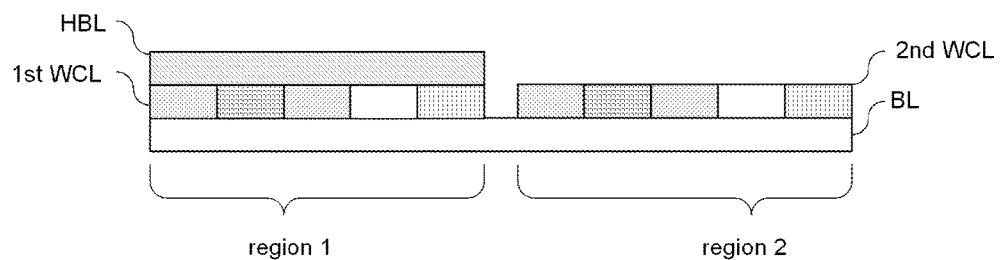
FIG. 3 is a structural diagram of a radiational cooling film according to a third exemplary embodiment.

FIG. 3 is a structural diagram of a radiational cooling film according to a third exemplary embodiment.

Referring to FIG. 3, in the radiational cooling film, both a wavelength conversion layer WCL and a heat transfer layer HBL are formed on one surface, i.e., on the same surface, of a base layer BL.

The base layer BL, the wavelength conversion layer WCL and the heat barrier layer HBL are sequentially stacked in a region 1 in which the heat barrier layer HBL is formed, and the base layer BL and the wavelength conversion layer WCL are sequentially stacked in a region 2 in which the heat barrier layer HBL is not formed.

A plurality of wavelength conversion sections of the wavelength conversion layer WCL may be formed in the same manner in the region 1 and the region 2, or may be formed in different manners in the region 1 and the region 2.

Figure 4:
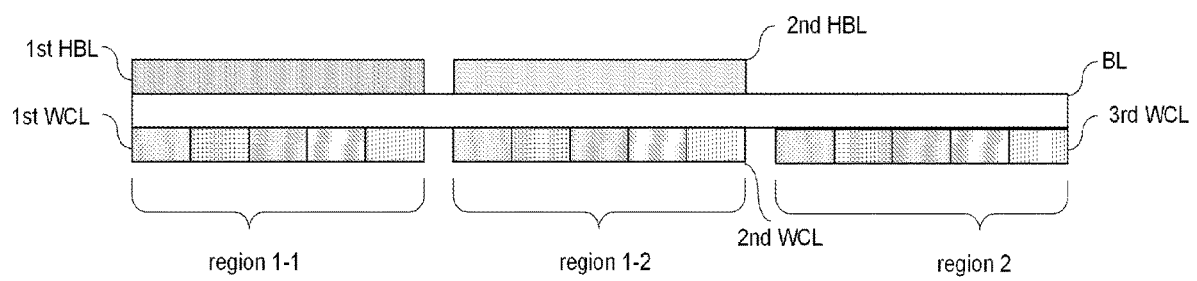
FIG. 4 is a structural diagram of a radiational cooling film according to a fourth exemplary embodiment.

FIG. 4 is a structural diagram of a radiational cooling film according to a fourth exemplary embodiment.

Referring to FIG. 4, in the radiational cooling film, a heat barrier layer HBL includes a plurality of heat barrier sections configured to have different heat shielding rates on one surface of a base layer BL in a region 1.

Although FIG. 4 describes that two heat barrier sections (i.e., a first heat barrier section and a second heat barrier section) are formed, it is understood that two or more heat barrier sections may be formed. The first heat barrier section having a heat shielding rate A is formed in a region 1-1, and the second heat barrier section having a heat shielding rate B is formed in a region 1-2.

For example, the first heat barrier section in the region 1-1 may be configured to have a heat shielding rate of 70%, and the second heat barrier section in the region 1-2 may be configured to have a heat shielding rate of 40%.

Further, the first heat barrier section in the region 1-1 may be used in summer, the second heat barrier section in the region 1-2 may be used in spring and fall, and the region 2 may be used in winter.

In addition, the first heat barrier section in the region 1-1 may be used at noon, the second heat barrier section in the region 1-2 may be used in time zones before and after noon, and the region 2 may be used at sunrise and sunset.

A wavelength conversion layer WCL is formed on the other surface of the base layer BL opposite the heat barrier layer HBL.

A plurality of wavelength conversion sections of the wavelength conversion layer WCL may be repeatedly formed in the same manner in the heat barrier sections in the region 1-1 and the region 1-2 of the region 1 and the region 2. The region 1-1, the region 1-2 and the region 2 may have the same area or different areas.

Figure 5:
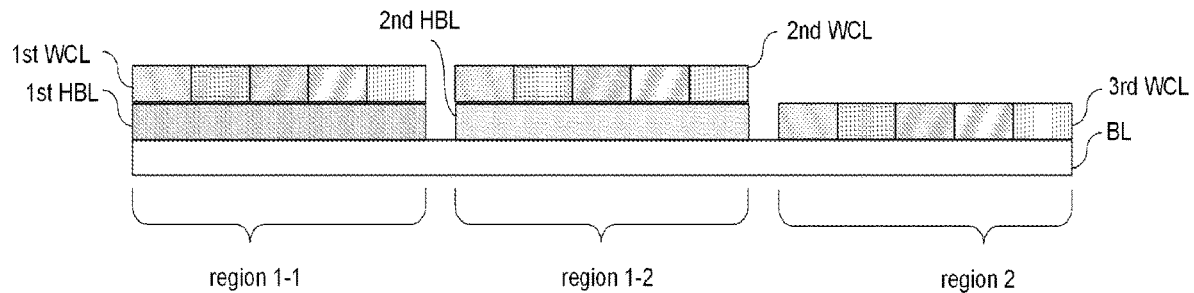
FIG. 5 is a structural diagram of a radiational cooling film according to a fifth exemplary embodiment.

FIG. 5 is a structural diagram of a radiational cooling film according to a fifth exemplary embodiment.

Referring to FIG. 5, in the radiational cooling film, a heat barrier layer HBL and a wavelength conversion layer WCL are sequentially stacked on a base layer BL in a region 1-1 and a region 1-2, and the heat barrier layer HBL includes heat barrier sections configured to have different heat shielding rates in the region 1-1 and the region 1-2, respectively. The wavelength conversion layer WCL is stacked on the base layer BL in a region 2.

A plurality of wavelength conversion sections of the wavelength conversion layer WCL may be repeatedly formed in the same manner in the region 1-1, the region 1-2 and the region 2, and the wavelength conversion sections may be formed in a different manner in at least one of the region 1-1, the region 1-2 and the region 2.

Figure 6:
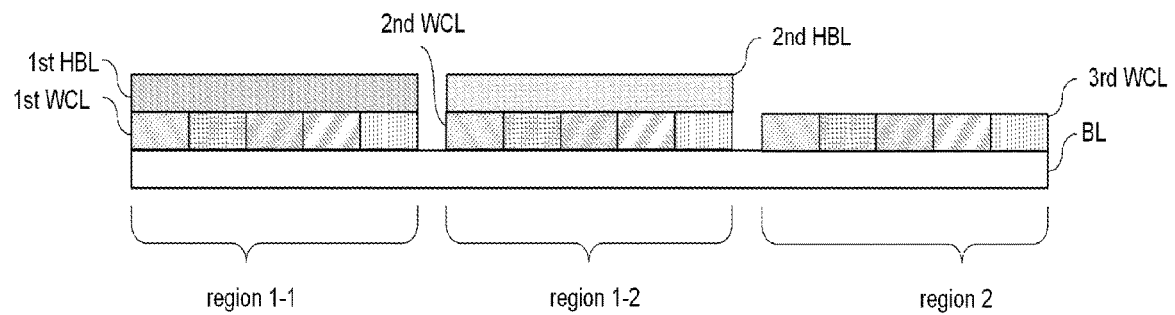
FIG. 6 is a structural diagram of a radiational cooling film according to a sixth exemplary embodiment.

FIG. 6 is a structural diagram of a radiational cooling film according to a sixth exemplary embodiment.

Referring to FIG. 6, in the radiational cooling film, a wavelength conversion layer WCL is stacked in a base layer BL in a region 1-1, a region 1-2 and a region 2, and a heat barrier layer HBL is stacked on the wavelength conversion layer WCL in the region 1-1 and the region 1-2. Further, the heat barrier layer HBL includes heat barrier sections configured to have different heat shielding rates in the region 1-1 and the region 1-2, respectively.

A plurality of wavelength conversion sections of the wavelength conversion layer WCL may be repeatedly formed in the same manner in the region 1-1, the region 1-2 and the region 2, and the wavelength conversion sections may be formed in a different manner in at least one of the region 1-1, the region 1-2 and the region 2.

Figure 7:
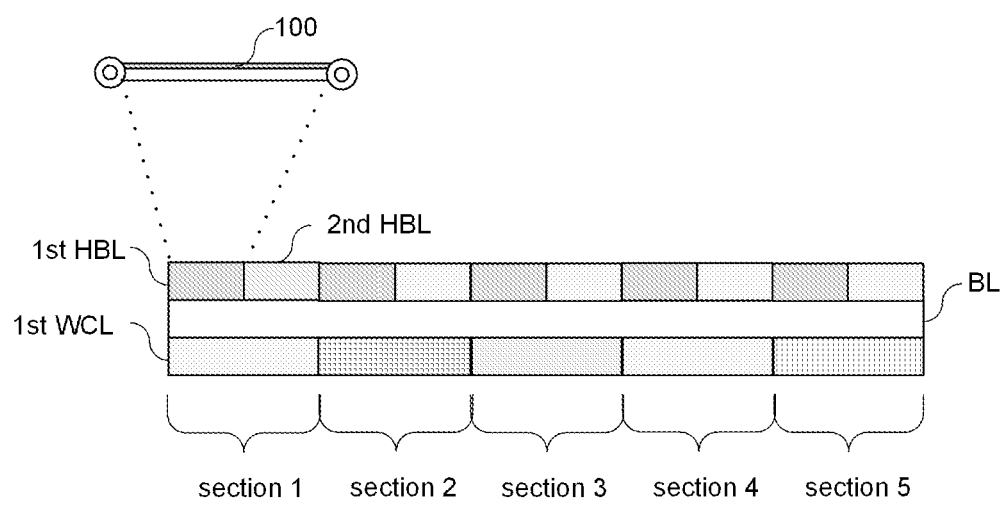
FIG. 7 is a structural diagram of a radiational cooling film according to a seventh exemplary embodiment.

FIG. 7 is a structural diagram of a radiational cooling film according to a seventh exemplary embodiment.

Referring to FIG. 7, in the radiational cooling film, a heat barrier layer is provided on one surface of a base layer BL such that a first heat barrier section $1^{st}$ HBL and a second heat barrier section $2^{nd}$ HBL are alternately repeatedly arranged, and a wavelength conversion layer is provided on the other surface of the base layer BL such that one wavelength conversion section configured to radiate the same wavelength is arranged throughout the first heat barrier section $1^{st}$ HBL and the second heat barrier section $2^{nd}$ HBL adjacent to each other.

That is, the radiational cooling film is configured such that a plurality of heat barrier sections having different heat shielding rates are arranged in each of the wavelength conversion sections, i.e., sections 1 to 5, of the wavelength conversion layer WCL.

For example, the heat barrier layer HBL divided into a heat barrier section and a heat transmission section may be formed in one wavelength conversion section configured to radiate the same wavelength. Alternatively, the heat barrier layer HBL divided into a heat barrier section having a heat shielding rate A, a heat barrier section having a heat shielding rate B and a heat transmission section may be formed in one wavelength conversion section configured to radiate the same wavelength.

In FIG. 7, the wavelength conversion layer WCL is formed on one surface of the base layer BL and the heat barrier layer HBL is formed on the other surface of the base layer BL. It is understood that the wavelength conversion layer WCL and the heat barrier layer HBL may be sequentially stacked or the heat barrier layer HBL and the wavelength conversion layer WCL may be sequentially stacked on one surface of the barrier layer BL.

Further, although FIG. 7 illustrates that the wavelength conversion layer WCL is divided into five wavelength conversion sections, i.e., the sections 1 to 5, wavelength conversion layer WCL is not limited thereto, and the number of the wavelength conversion sections may be less than five or more than five.

In areas with a large difference in temperature between day and night, such as in the desert, the radiational cooling film needs to replace the heat barrier sections with different heat shielding rates several times a day. Further, because the growth stage of living bodies to be grown does not change in a day or two, it may not be necessary to change the heat barrier sections. Therefore, when the heat barrier sections having different heat shielding rates are disposed adjacent to each other in one wavelength conversion section configured to radiate the same wavelength as described in the seventh exemplary embodiment, the moving distance of the radiational cooling film is shorter than the first to sixth exemplary embodiments, so re-arrangement of the radiational cooling film may be performed rapidly and consumption of electrical energy due to the movement of the radiational cooling film may be minimized.

Figure 8:
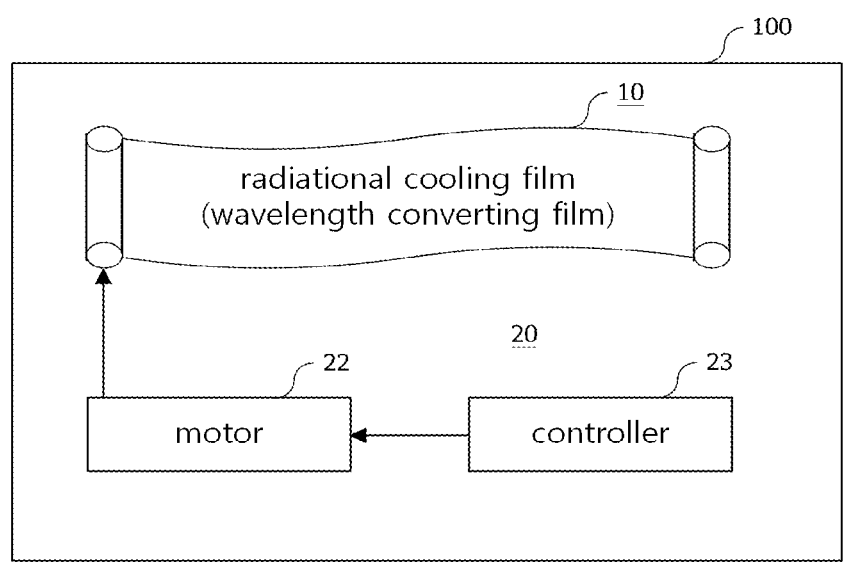
FIG. 8 is a block diagram of a wavelength conversion device according to an eighth exemplary embodiment.

FIG. 8 is a block diagram of a wavelength conversion device according to an eighth exemplary embodiment.

Referring to FIG. 8, a wavelength conversion device 100 includes a radiational cooling film 10 and a driving unit 20.

As the radiational cooling film 10, any one of the radiational cooling films according to the first to seventh exemplary embodiments may be used. Therefore, a detailed description of the radiation cooling film 10 is omitted.

The driving unit 20 may change the section of the radiational cooling film 10 to which sunlight is incident by winding both ends of the radiational cooling film 10 around two rollers 21 and rotating at least one of the two rollers 21.

The driving unit 20 includes the two rollers 21, a motor 22 and a controller 23.

The wavelength conversion device 100 may be installed on a roof of a facility or in a window formed in a side wall of the facility.

One end of the radiational cooling film 10 is wound around any one of the rollers 21. The two rollers 21 rotate in the same direction, i.e., in a forward or the reverse direction to change the section of the radiational cooling film 10 on which sunlight is incident.

The motor 22 is connected to at least one of the two rollers 21 and applies a rotational force to the roller 21 to which motor 22 is connected. The motor 22 may employ any one of an AC motor, a BLDC motor and a DC motor.

The controller 23 controls the RPM and the rotational direction of the motor 22. The controller 23 changes the section of the radiational cooling film 10 to which sunlight is radiated in response to a control signal transmitted from a management server.

Figure 9:
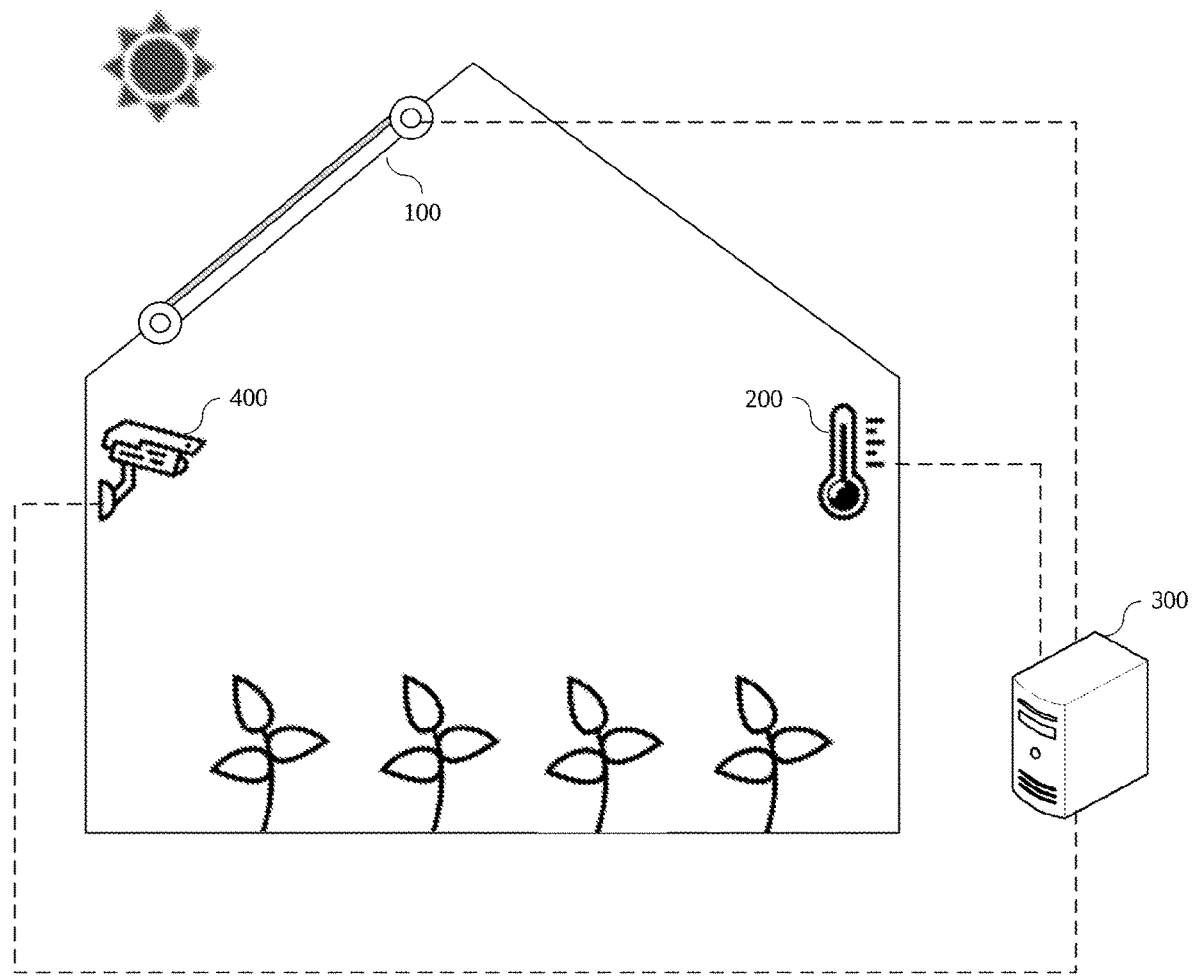
FIG. 9 is a view illustrating a configuration of a wavelength conversion system according to a ninth exemplary embodiment.

FIG. 9 is a view illustrating the configuration of a wavelength conversion system according to a ninth exemplary embodiment.

Referring to FIG. 9, the wavelength conversion system includes a wavelength conversion device 100, a temperature sensor 200, a management server 300, and a camera 400.

The wavelength conversion device 100 is the same as the wavelength conversion device 100 according to the eighth exemplary embodiment, and a detailed description thereof is omitted.

The temperature sensor 200 is installed in a facility to measure the internal temperature of the facility periodically or in real time.

The management server 300 compares a value measured by the temperature sensor 200 with a threshold value and determines any one of the heat barrier sections of the radiational cooling film based on a result of the comparison. Then, the management server 300 transmits a control signal to move the radiational cooling film so that sunlight is radiated to a wavelength conversion section configured to emit a wavelength suitable for the growth stage of the living bodies to be grown among the wavelength conversion sections arranged in the determined heat barrier section.

The camera 400 installed in the facility photographs the living bodies to be grown in the facility, and transmits the photographed image data to the management server 300.

The temperature sensor 200 and the camera 400 may communicate with the management server 300 through communication modules provided therein, or may communicate with the management server 300 through a communication terminal such as a set-top box connected thereto. Further, the temperature sensor 200 and the camera 4000 may communicate with the management server 300 or the set-top box by wire or wirelessly.

Figure 10:
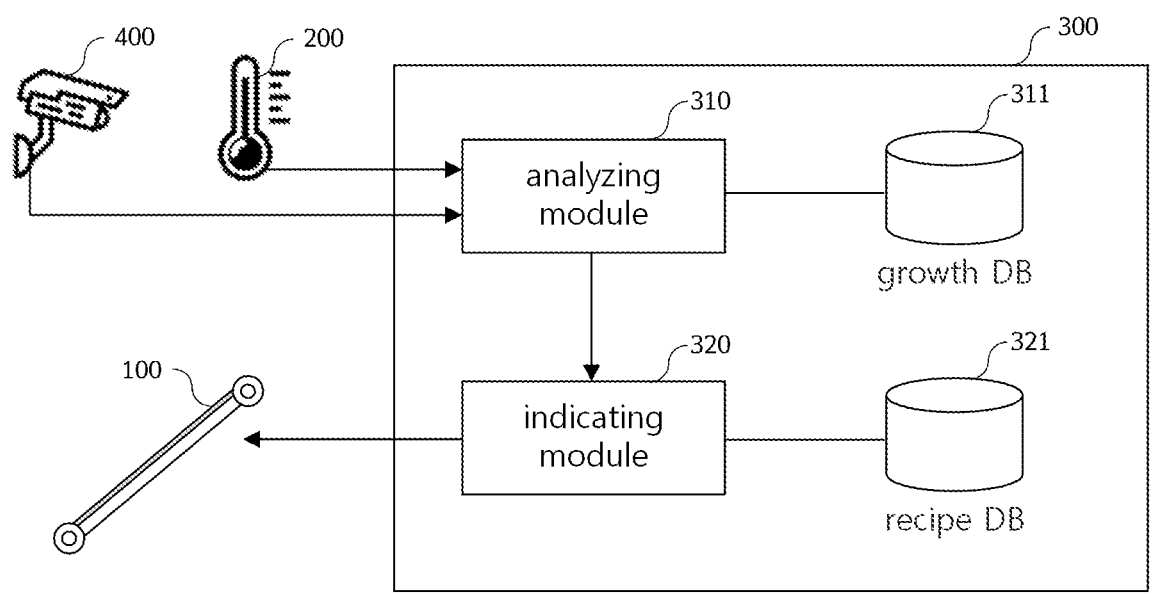
FIG. 10 is a block diagram of a management server of the wavelength conversion system according to the ninth exemplary embodiment.

FIG. 10 is a block diagram of the management server 300 of the wavelength conversion system according to the ninth exemplary embodiment.

Referring to FIG. 10, the management server 300 includes an analyzing module 310, a growth database 311, an indicating module 320 and a recipe database 321.

The analyzing module 310 compares the measured value transmitted by the temperature sensor 200 with the threshold value and determines any one of the heat barrier sections of the radiational cooling film based on a result of the comparison. For example, if the radiational cooling film is divided into a heat barrier section and a heat transmission section, and the indoor temperature measured by the temperature sensor 200 is higher than the threshold value, the analyzing module 310 of the management server 300 may determine the heat barrier section as a section to which sunlight is radiated to lower the indoor temperature.

Further, the analyzing module 310 determines the growth stage of the living bodies to be grown by analyzing photographed image data transmitted from the camera 400, and determines a wavelength conversion section suitable for the growth stage of the living bodies to be grown.

For example, the analyzing module 310 may compare the photographed image data with growth data of plants stored in the growth database 311 and determine the growth stage of the living bodies to be grown based on at least one of a height, a leaf size, a leaf color and the number of leaves of the living bodies to be grown, and presence or absence of fruits of the living bodies to be grown.

The growth database 311 stores data indicating the growth stage of the living bodies to be grown. For example, the growth database 311 may store images of an irreversible change in the size of the living bodies to be grown with time. In case of plants, the growth database 311 may store information on the height, the leaf size, the leaf color and the number of leaves of the plants, presence or absence of fruits of the plants in the germination stage, the initial growth stage, the flowering stage, the fruiting stage, etc.

The indicating module 320 receives identification information of the heat barrier section and the wavelength conversion section determined by the analyzing module 310. Further, the indicating module 320 transmits to the wavelength conversion device 100 a control signal to move the radiational cooling film so that sunlight is radiated to the heat barrier section and the wavelength conversion section corresponding to the received information.

The recipe database 321 stores wavelength information required according to the growth stage of the living bodies to be grown. For example, the recipe database 321 may store necessary wavelength information in the germination stage, the initial growth stage, the flowering stage, and the fruiting stage of the plants.

As is apparent from the above description, one or more exemplary embodiments provide a radiational cooling film providing a variable wavelength which determines a solar heat shielding rate according to the internal temperature of a facility and changes a wavelength conversion section of the film exposed to sunlight to radiate a necessary wavelength according to the growth stage of plants, and a wavelength conversion device and system using the same, thereby being capable of saving cooling and heating costs used in the facility and promoting growth of the plants.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A radiational cooling film providing a variable wavelength comprising:
   a base layer including a first region and a second region on one surface;
   a heat barrier layer disposed on a part of the other surface of the base layer, the first region being provided with the heat barrier layer, and the second region being not provided with the heat barrier layer, wherein the heat barrier layer reflects infrared band from sunlight; and
   a wavelength conversion layer comprising a pattern of a plurality of wavelength conversion sections,
   wherein the pattern of the plurality of wavelength conversion sections is repeatedly disposed in the wavelength conversion layer with a separating distance therebetween such that the first region has the same pattern of the plurality of wavelength conversion sections and the second region has the same pattern of the plurality of wavelength conversion sections.

2. The radiational cooling film according to claim 1, wherein the wavelength conversion sections are formed on a remaining surface of the base layer.

3. The radiational cooling film according to claim 1, wherein the wavelength conversion sections are formed on a surface of the base layer in which the heat barrier layer is formed.

4. The radiational cooling film according to claim 1, wherein the first region comprises a plurality of heat barrier sections having different heat shielding rates.

5. The radiational cooling film according to claim 4, wherein the wavelength conversion sections are repeatedly formed in the same pattern in each of the heat barrier sections and the second region.

6. The radiational cooling film according to claim 1, wherein:
   the first region and the second region are alternately and repeatedly arranged; and
   one wavelength conversion section configured to radiate the same wavelength is arranged throughout the first region and the second region adjacent to each other.

7. A wavelength conversion device providing a variable wavelength comprising:
   a radiational cooling film configured such that one surface of a base layer comprises a first region in which a heat barrier layer is formed and a second region in which the heat barrier layer is not formed, and a wavelength conversion layer comprises a pattern of a plurality of wavelength conversion sections, wherein the heat barrier layer reflects infrared band from sunlight; and
   a driving unit comprising two rollers configured to wind both ends of the radiational cooling film, a motor configured to apply rotational force to at least one of the two rollers, and a controller configured to control an RPM and a rotational direction of the motor,
   wherein the pattern of the plurality of wavelength conversion sections is repeatedly disposed in the wavelength conversion layer with a separating distance therebetween such that the first region has the same pattern of the plurality of wavelength conversion sections and the second region has the same pattern of the plurality of wavelength conversion sections.

8. The wavelength conversion device according to claim 7, wherein the wavelength conversion sections are formed on a remaining surface of the base layer.

9. The wavelength conversion device according to claim 7, wherein the wavelength conversion sections are formed on a surface of the base layer in which the heat barrier layer is formed.

10. The wavelength conversion device according to claim 7, wherein the first region comprises a plurality of heat barrier sections having different heat shielding rates.

11. The wavelength conversion device according to claim 10, wherein the wavelength conversion sections are repeatedly formed in the same pattern in each of the heat barrier sections and the second region.

12. The wavelength conversion device according to claim 7, wherein:
   the first region and the second region are alternately and repeatedly arranged; and
   one wavelength conversion section configured to radiate the same wavelength is arranged throughout the first region and the second region adjacent to each other.

13. A wavelength conversion system providing a variable wavelength comprising:
- a wavelength conversion device comprising a radiational cooling film configured such that one surface of a base layer comprises a first region in which a heat barrier layer is formed and a second region in which the heat barrier layer is not formed, and a wavelength conversion layer comprises a plurality of wavelength conversion sections separated from each other in each of the first region and the second region, and a driving unit comprising two rollers configured to wind both ends of the radiational cooling film, a motor configured to apply rotational force to at least one of the two rollers, and a controller configured to control an RPM and a rotational direction of the motor;
- a temperature sensor installed in a facility; and
- a management server configured to control the wavelength conversion device so that sunlight is radiated to one of the wavelength conversion sections of the first region if a value measured by the temperature sensor is greater than a threshold value; and
- a camera configured to photograph living bodies to be grown in the facility,
- wherein the management server comprises an analyzing module configured to determine a growth stage of the living bodies to be grown based on image data transmitted by the camera, and an indicating module configured to determine one of the first region and the second region based on the value measured by the temperature sensor and to control the wavelength conversion device so that sunlight is radiated to one of the wavelength conversion sections of the determined region to emit a necessary wavelength depending on the determined growth stage.

14. The wavelength conversion system according to claim 4, wherein the wavelength conversion sections are repeatedly formed in the same pattern in the first region and the second region.

15. The wavelength conversion system according to claim 13, wherein the wavelength conversion sections are formed on a remaining surface of the base layer.

16. The wavelength conversion system according to claim 13, wherein the wavelength conversion sections are formed on a surface of the base layer in which the heat barrier layer is formed.

17. The wavelength conversion system according to claim 13, wherein the first region comprises a plurality of heat barrier sections having different heat shielding rates.

18. The wavelength conversion system according to claim 17, wherein the wavelength conversion sections are repeatedly formed in the same pattern in each of the heat barrier sections and the second region.

19. The wavelength conversion system according to claim 13, wherein:
- the first region and the second region are alternately repeatedly and arranged; and
- one wavelength conversion section configured to radiate the same wavelength is arranged throughout the first region and the second region adjacent to each other.

* * * * *